United States Patent [19]
Sun

[11] Patent Number: 5,912,292
[45] Date of Patent: Jun. 15, 1999

[54] SODIUM BENZOATE AS A NUCLEATING AGENT FOR MONOAXIALLY ORIENTED POLYPROPYLENE FILM

[75] Inventor: Likuo Sun, Houston, Tex.

[73] Assignee: Fina Technology, Inc., Dallas, Tex.

[21] Appl. No.: 08/034,794

[22] Filed: Feb. 10, 1993

[51] Int. Cl.⁶ .............................. C08K 5/09; C08F 110/06
[52] U.S. Cl. ........................................... 524/301; 524/583
[58] Field of Search ..................................... 524/396, 400, 524/301, 583

[56] References Cited

U.S. PATENT DOCUMENTS 3,540,979  11/1970  Hughes ..................................... 524/396

Primary Examiner—Christopher Henderson
Attorney, Agent, or Firm—Jim Wheelington; M. Norwood Cheairs

[57] ABSTRACT

A mono-axially oriented polypropylene film with sodium benzoate as a nucleating agent results in reduced shrinkage and increase stretchability. The sodium benzoate ranges up to 1000 ppm. The polypropylene used in making the film preferably has an isotacticity exceeding 97% as determined by $C^{13}$-NMR spectroscopy. The film preferably has a thicknesses of about 0.5 mil to 5.0 mil and, more preferably, about 1.0 mil to 3.0 mil. The sodium benzoate preferably has a purity of 99% and a particle size of from about 1 micron to about 3 microns.

6 Claims, 2 Drawing Sheets

SODIUM BENZOATE AS A NUCLEATING AGENT FOR MONOAXIALLY ORIENTED POLYPROPYLENE FILM

BACKGROUND OF THE INVENTION

1. Field of the Invention

This invention relates to polypropylene film, specifically to mono-axially oriented polypropylene film with sodium benzoate as a nucleating agent to reduce shrinkage and increase stretchability.

2. Description of the Prior Art

Polypropylene copolymers and homopolymers are produced in numerous grades and formulations. Among the outstanding properties of polypropylene are low density, high melting point, high tensile strength, rigidity, stress crack resistance, abrasion resistance, low creep and a surface which is highly resistance to chemical attack.

Polypropylene film (usually 0.5 to 1.0 mil in thickness) is made by tubular and casting film extrusion methods. Two forms of polypropylene film are produced, oriented and unoriented. Unoriented film has good transparency, tensile strength, machinability, electrical properties, high gloss, resistant to grease and oil, heat resistance and can be printed, coated and heat-sealed. Orienting polypropylene film improves some of its properties, particularly tensile strength, stiffness, moisture- and gas-barrier properties, grease and oil resistance, low-temperature impact strength, abrasion resistance, optical properties and heat shrinkability.

In a tape orienting process, amorphous orientation and destruction of crystal structure in cold-drawing lead to a thermodynamically unstable system which, given some time, tend toward some equilibrium. Given the opportunity, the strained molecular segments in this unstable system will try to rearrange themselves in a state of lowest potential energy. The process results in tape shrinkage and, consequently, tape dimension instability.

The use of inorganic fillers to improve the mechanical properties of polyolefin films is known. Using very small amounts (below 0.5 wt %) a significant improvement in transparency is attained. This improvement is attributed to the formation of smaller, more numerous spherulites as the polymer solidifies from the molten state. Accompanying this change in morphology is a marked increase in crystallization rate and a higher crystallization temperature. In addition to the improved optical properties, nucleation results in better processing characteristics and improved strength.

Certain inorganic fillers and organic compounds serve as nucleating agents for polyethylene, polyethylene terephthalate (PET), polyamides, polypropylene and polybutylene. Addition of these nucleating agents to olefin polymers provides an increase in the crystallization temperature and/or an improvement in the optical properties of the polymer. The use of nucleating agents can allow a shorter cycle time and better productivity. However, the use of certain nucleating agents may be limited by costs, processing problems or acceptability in medical or food applications.

Nucleating agents allow the polymer to be crystallized at a higher temperature during processing. Examples of nucleating agents are aromatic carboxylic acids and their metal salts, such as sodium benzoate, aluminum p-tert-butyl benzoate, and aluminum benzoate; metal organophosphates such as di(4-tert-butylphenyl) phosphate; benzylidene sorbitol compounds; talc, polyvinyl Cyclohexane; and organic dicarboxylic acids such as oxalic acid, 1,2-cyclohexanedicarboxylic acid, phathalic acid and malonic acid.

The size of polymer spherulites can be adjusted by incorporating nucleating agents. The use of nucleating agents favors smaller spherulite sizes.

As noted above, sodium benzoate is a known nucleating agent. Japanese Patent Application 80329/1983 discloses a specific method of dispersing sodium benzoate as a nucleating agent in polypropylene to improve transparency. However, as disclosed in U.S. Pat. Nos. 5,135,975 and 5,112,894, sodium benzoate is a higher melting nucleating agent that has dispersion problems. Sodium benzoate has been disclosed in U.S. Pat. No. 5,118,566 as a nucleating agent in a biaxially-oriented film with high mechanical strength.

In the article "Making Microcellular Foams from Crystalline Polymers" by Jonathan S. Colton in *Plastics Engineering*, Vol. 44, No. 8, page 53 (1988), it was disclosed that small amounts of sodium benzoate in polypropylene enhanced nucleation by providing a large enough number of sites with appropriate surface energy conditions and by reducing the overall surface tension of the polymer. This article recommends an amount of nucleating agent near its solubility limit, typically 1% by weight (ibid., page 55).

Nucleating agents are typically used to stiffen polymer film. While film of formulations using nucleating agents such as sodium benzoate may show an increase in the modulus of elasticity over that for unnucleated film, such formulations, as disclosed in U.S. Pat. No. 5,118,566, do not result in an decrease in shrinkage. In fact, as demonstrated by the data in U.S. Pat. No. 5,118,566, an increase in shrinkage may result.

It would be advantageous to use an additive in uni- or mono-axially oriented film which would reduce shrinkage. Low shrinkage is a highly desirable property for such applications as woven fabrics. It would be preferable if the additive is known to be acceptable as a component for food or medical applications.

SUMMARY OF THE INVENTION

Accordingly, this invention provides a uni- or mono-axially oriented polypropylene film with sodium benzoate as an additive to reduce shrinkage and a process for producing this film.

This and other objects are accomplished by a mono-axially oriented polypropylene film comprising:
1) polypropylene,
2) sodium benzoate,
wherein the sodium benzoate ranges up to 1000 ppm.

BRIEF DESCRIPTION OF THE DRAWINGS

A more complete appreciation of the invention and many of the attendant advantages thereof will be readily understood by reference to the following detailed description when considered in connection with the accompanying drawings wherein.

DETAILED DESCRIPTION OF THE INVENTION

Figure 1:
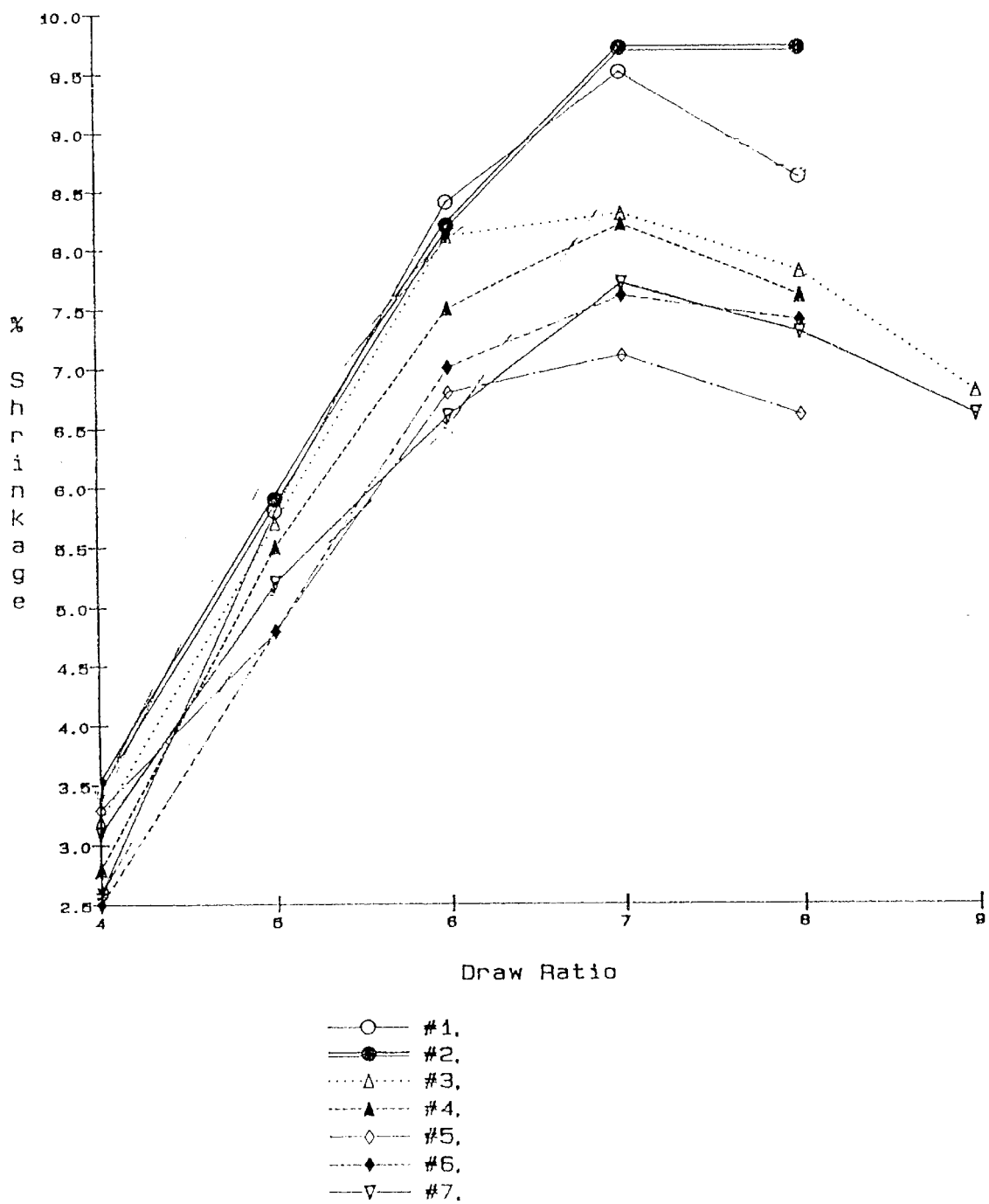
FIG. 1 shows percent shrinkage in relation to sodium benzoate concentration.

The polypropylene of the present invention is a commercially available crystalline polypropylene. Crystalline polypropylene exists in two basic structures: isotactic and syndiotactic. The isotactic structure is typically described as having the methyl groups attached to the tertiary carbon atoms of successive monomeric units on the same side of a hypothetical plane through the main chain of the polymer, i.e., the methyl groups are all above or all below the plane. Using the Fischer projection formula, the stereochemical sequence of isotactic polypropylene is described as follows:

Another way of describing the structure is through the use of NMR spectroscopy. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

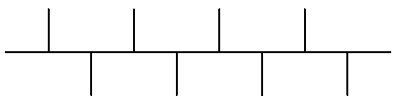

In NMR nomenclature, this pentad is described as . . . rrrr . . . in which each "r" represents a "racemic" dyad, i.e., successive methyl group on alternate sides of the plane. The percentage of r dyads in the chain determines the degree of syndiotacticity of the polymer. Syndiotactic polymers are crystalline and, like the isotactic polymers, are insoluble in xylene.

This crystallinity distinguishes both syndiotactic and isotactic polymers from amorphous or atactic polymer which is soluble in xylene. Atactic polymer exhibits no regular order of repeating unit configurations in the polymer chain and forms essentially a waxy product.

While it is possible to produce all three types of polymer, it is desirable to produce predominantly isotactic or syndiotactic polymer with very little atactic polymer. The polypropylene polymer of the present invention is isotactic polypropylene. The polypropylene component of the present invention comprises an isotactic polypropylene having an isotacticity exceeding 97% as determined by $C^{13}$-NMR spectroscopy.

The film of the present invention is prepared in single stage draw process. In this process the polypropylene is plastified and compressed in a extruder. The melt is then extruded through a flat sheet die and water quenched. The polypropylene sheet so produced is thereafter uni- or mono-axially drawn, i.e., longitudinally with respect to the direction of extrusion at temperatures below the melting point of the polypropylene used, the draw ratio in the longitudinal direction being at least about 4:1. The film may have any predetermined thickness; however, thicknesses of about 0.5 mil to 5.0 mil and preferably 1.0 mil to 3.0 mil are particularly useful in the intended field of the present invention.

The sodium benzoate of the present invention has a purity of 99% and particle size of from about 1.0 microns to about 3.0 microns. The particle size analysis indicates the following distribution:

| Range (microns) | |
|---|---|
| 0–1.0 | 21.51% |
| 1–2.0 | 15.0% |
| 2.0–3.0 | 1.08% |
| 3.0–4.0 | 0.65% |

The invention having been generally described, the following examples are given as particular embodiments of the invention and to demonstrate the practice and advantages thereof. It is understood that the examples are given by way of illustration and are not intended to limit the specification or the claims to follow in any manner.

PROCEDURE FOR COMPOUNDING POLYPROPYLENE FORMULATIONS The following table describes the base formulation:

| Base formulation | Parts by weight |
|---|---|
| Polypropylene homopolymer powder | 100 |
| Primary anti-oxidant | 0.001 |
| Secondary anti-oxidant | 0.0005 |

The powder and the additives were blended in a high intensity mixer at low speed for 0.5 minutes and 1.5 minutes at high speed. The mixture was then melt blended and pelletized using an extruder.

PROCEDURE FOR MAKING MONO-AXIALLY ORIENTED FILM

Polypropylene pellets are melted in a 2½", 30:1 L/D extruder. The melt is forced through a slot opening die and formed a thin film. As the molten product flows from the die, it passes through a water quench bath where it is solidified into a uniform gage film.

The film is then passed through a slitter bar where razor blades slit the film into predetermined widths. The split tapes continue to pass through a convection oven, which heats the polymer closed to the melting point and allows the tapes to be stretched. The stretch ratio is typically between 5:1 and 7:1.

To reduce tape shrinkage, the stretched tapes are heated, annealed and relaxed. Each of the tapes is wound on a separated winder system.

COMPARATIVE EXAMPLES

Example 1

The above procedures for compounding a polypropylene formulation and for making a mono-axially oriented film were followed. The results are shown in Table I below.

Example 2

The procedure for Example 1 was followed except 0.015 wt % of sodium benzoate was added. The results are shown in Table I below.

Example 3

The procedure for Example 1 was followed except 0.025 wt % of sodium benzoate was added. The results are shown in Table I below.

Example 4

The procedure for Example 1 was followed except 0.050 wt % of sodium benzoate was added. The results are shown in Table I below.

Example 5

The above procedures for compounding a polypropylene formulation and for making a mono-axially oriented film were followed except a secondary anti-oxidant was substituted in the formulation. The results are shown in Table I below.

Example 6

The procedure for Example 5 was followed except 0.015 wt % of sodium benzoate was added. The results are shown in Table I below.

Example 7

The procedure for Example 5 was followed except 0.025 wt % of sodium benzoate was added. The results are shown in Table I below.

TABLE I

| Example | #1 | #2 | #3 | #4 | #5 | #6 | #7 |
|---|---|---|---|---|---|---|---|
| Drawability | | | | | | | |
| Tape Breaks, % @ 8:1 Draw Ratio | 91 | 36 | 41 | 48 | 11 | 16 | 5 |
| Tape Breaks @ 9:1 | — | 100 | — | — | — | — | 93 |
| Water Carryover | | | | | | | |
| Take Away Speed @ Major WCO Starts, fpm | 150 | 150 | 150 | 150 | 150 | 150 | 145 |
| Tape Physicals | | | | | | | |
| Shrinkage, | | | | | | | |
| 4:1 | 2.6 | 3.2 | 2.8 | 3.3 | 3.5 | 2.5 | 3.1 |
| 5:1 | 5.8 | 5.7 | 5.5 | 4.8 | 5.9 | 4.8 | 5.2 |
| 6:1 | 8.4 | 8.1 | 7.5 | 6.8 | 8.2 | 7.0 | 6.6 |
| 7:1 | 9.5 | 8.3 | 8.2 | 7.1 | 9.7 | 7.6 | 7.7 |
| 8:1 | 8.6 | 7.8 | 7.6 | 6.6 | 9.7 | 7.4 | 7.3 |
| 9:1 | — | 6.8 | — | — | — | — | 6.6 |
| Tenacity @ Break, g/den | | | | | | | |
| 4:1 | 4.51 | 4.25 | 4.24 | 4.23 | 4.30 | 4.18 | 4.22 |
| 5:1 | 5.78 | 5.57 | 5.52 | 5.79 | 5.56 | 5.69 | 5.54 |
| 6:1 | 6.93 | 6.95 | 6.95 | 7.21 | 6.90 | 6.85 | 6.82 |
| 7:1 | 7.24 | 6.62 | 6.78 | 6.19 | 6.90 | 6.46 | 5.97 |
| 8:1 | 5.58 | 5.83 | 5.80 | 5.91 | 5.27 | 5.78 | 5.33 |
| 9:1 | — | 5.77 | — | — | — | — | 5.57 |
| Modulus @ 5% Elong., g/den | | | | | | | |
| 4:1 | 26.59 | 26.93 | 25.65 | 27.52 | 27.48 | 25.12 | 25.45 |
| 5:1 | 38.36 | 39.12 | 38.69 | 42.49 | 39.01 | 38.88 | 40.04 |
| 6:1 | 49.17 | 50.97 | 49.85 | 55.11 | 50.34 | 49.24 | 50.77 |
| 7:1 | 59.39 | 61.78 | 60.78 | 63.84 | 60.63 | 58.45 | 60.78 |
| 8:1 | 70.29 | 72.50 | 69.19 | 74.84 | 72.17 | 68.76 | 70.01 |
| 9:1 | — | 81.42 | — | — | — | — | 81.02 |
| % Elongation @ Break | | | | | | | |
| 4:1 | 43.2 | 45.54 | 46.11 | 51.33 | 45.07 | 38.61 | 49.01 |
| 5:1 | 28.85 | 30.95 | 33.03 | 30.01 | 27.84 | 28.62 | 30.28 |
| 6:1 | 24.85 | 25.66 | 26.10 | 25.31 | 24.27 | 26.39 | 24.53 |
| 7:1 | 18.22 | 16.13 | 18.85 | 14.35 | 17.47 | 17.14 | 16.64 |
| 8:1 | 13.62 | 11.97 | 12.72 | 10.41 | 10.40 | 11.79 | 11.22 |
| 9:1 | — | 10.09 | — | — | — | — | 11.47 |

As shown in Table I, addition of sodium benzoate to monoaxially oriented polypropylene film results in an improvement in tape drawability. The number of tape breaks significantly decreased in those samples having sodium benzoate as a nucleating agent.

Figure 2:
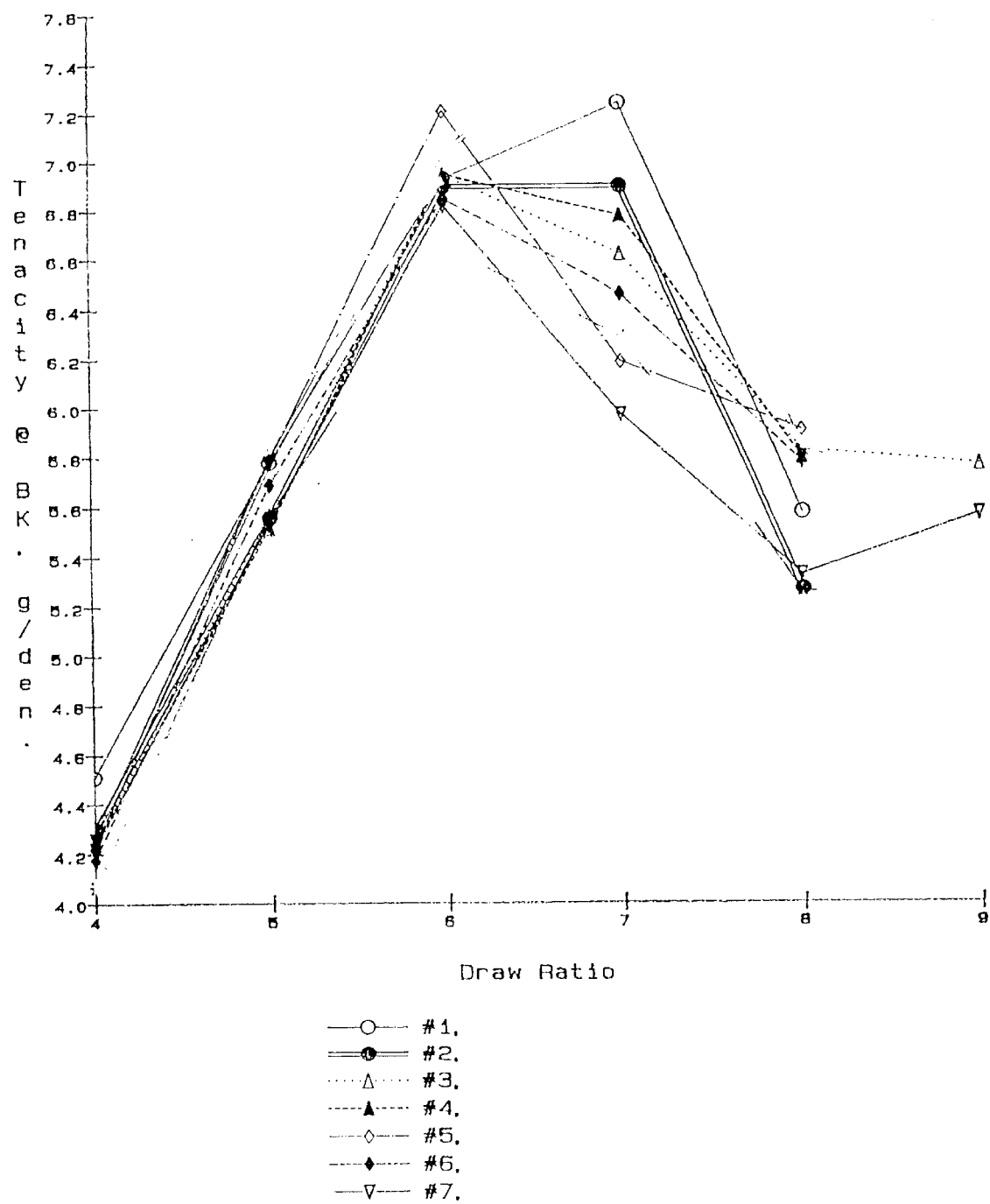
FIG. 2 shows the values of tenacity at break at various draw ratios.

FIG. 1 shows per cent shrinkage decreases as the sodium benzoate concentration increases. FIG. 2 illustrates the values of tenacity at break at various draw ratios.

The concentration of sodium benzoate seem to be optimum at 0.025 wt % (250 ppm). The shrinkage decreases as the sodium benzoate concentration increases. But the formulation with 0.050 wt % sodium benzoate exhibited a plateout problem.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A mono-axially oriented polypropylene film comprising:
   1) polypropylene,
   2) sodium benzoate,
wherein the sodium benzoate ranges up to 1000 ppm.

2. A polypropylene film as recited in claim 1 wherein the polypropylene has an isotacticity exceeding 97% as determined by $C^{13}$-NMR spectroscopy.

3. A polypropylene film as recited in claim 1 wherein the film has a thicknesses of about 0.5 mil to 5.0 mil.

4. A polypropylene film as recited in claim 1 wherein the film has a thicknesses of about 1.0 mil to 3.0 mil.

5. A polypropylene film as recited in claim 1 wherein the sodium benzoate has a purity of 99%.

6. A polypropylene film as recited in claim 1 wherein the sodium benzoate has a particle size of from about 1 micron to about 3 microns.

* * * * *